United States Patent [19]

Schrader

[11] 4,333,738
[45] Jun. 8, 1982

[54] SYNTHETIC FIRE LOG AND METHOD FOR MAKING SAME

[75] Inventor: Jimmy Schrader, Louisville, Ky.

[73] Assignee: John S. Mathis, Shelbyville, Ky. ; a part interest

[21] Appl. No.: 209,717

[22] Filed: Nov. 24, 1980

[51] Int. Cl.³ ............................................... C10L 5/10
[52] U.S. Cl. .................................................... 44/15 B
[58] Field of Search ................... 44/10 B, 15 R, 15 B, 44/24

[56] References Cited

U.S. PATENT DOCUMENTS

| 678,346 | 7/1901 | Mettler et al. | 44/24 |
| 1,454,410 | 5/1923 | Robison | 44/15 R |
| 3,297,419 | 1/1967 | Eyre, Jr. | 44/15 R |

Primary Examiner—O. R. Vertiz
Assistant Examiner—Margaret B. Medley
Attorney, Agent, or Firm—Maurice L. Miller, Jr.

[57] ABSTRACT

An improved synthetic fire log is disclosed which contains wood fibers or sawdust, coal liquid, molasses and paraffin wax in appropriate quantities. Green sawdust is first heated to a temperature of from 250 to 300 degrees F. to reduce the moisture content thereof and provide relatively dry sawdust. To the dry sawdust is added a quantity of coal liquid while the sawdust is at an elevated temperature of at least 200 degrees F. Next, molasses is added to the sawdust, coal liquid combination while the combination is in a temperature range of from 115–150 degrees F. Thereafter, paraffin wax in block form is added while the foregoing mixture is at an elevated temperature at least sufficient to melt the paraffin. Upon thorough incorporation of the materials, the resulting mixture is poured into a mold and compressed to form a stable, solid, compacted mass after which the mass is removed from the mold thus forming an improved synthetic fire log.

10 Claims, 2 Drawing Figures

SYNTHETIC FIRE LOG AND METHOD FOR MAKING SAME

BACKGROUND OF THE INVENTION

This invention relates generally to synthetic fire logs of the type often used as substitutes for natural wood logs in fireplaces, and methods for making the same. More specifically, the invention relates to synthetic fire logs made from, among other things, wood fibers or sawdust and wax.

Generally speaking, such synthetic logs are known and used in the prior art. See, for example, the log and method for making it as disclosed in U.S. Pat. No. 4,179,269 issued to Williard L. Yates on Dec. 18, 1979 wherein approximately 55-80 percent by weight of ground coal is mixed at room temperature with a small quantity of wood fiber ranging up to 10 percent by weight. With this substance is mixed melted slack wax in proportions ranging from 20-35 percent by weight such that a putty-like, extrudable mixture is formed. The latter mixture is then fed to an extruder while at a temperature elevated slightly above normal room temperature by reason of the addition of the melted slack wax, i.e. 80-95 degrees F. whereupon a cylindrical mass is extruded. The extruded mass is then cut to the desired lengths to form logs, the logs are rolled in a flame coloring agent and then wrapped for shipment.

Sawdust, coal dust, and molasses have also long been known as suitable agents for compressed synthetic fire kindlers as disclosed in U.S. Pat. No. 678,346 issued to C. W. Mettler, et al. on July 9, 1901. That patent teaches the saturation of sawdust with petroleum tar after which comminuted coke and powdered soft coal is thoroughly intermixed therewith. Thereafter, a composition consisting of starch and hot water containing 10 percent molasses is added to form a glutinous mass which is then molded under pressure into thin elongate fire kindler tubes. One difficulty encountered with this composition as mentioned in the reference is that care must be taken to thoroughly and equally intermix the components since the molasses and starch must be combined to form a primary binder to hold the tube together until used as a kindler and until burning is under way, after which the starch composition combines with the powdered soft coal to form a secondary binder to hold the mass together until it is completely burned.

In U.S. Pat. No. 734,743 issued to Alfred Paul on July 28, 1903, a fuel consisting of coal dust screenings, 14-15 pounds; wood sawdust, one to one and one-fourth pounds; ground resin, one pound, six ounces to one pound, 10 ounces; sour beer, one-half gallon; and molasses, four to eight ounces is disclosed. The mixture is pressed into form and baked or dried into a hard solid body suitable for use in a fireplace.

Another artificial fuel is disclosed in U.S. Pat. No. 764,526 issued to M. C. Gama, on July 5, 1904 consisting of crude oil; residum of refined oil equal to the quantity of crude oil; tallow, one-tenth to one-fifth of the quantity of the crude oil; sawdust or manure, one-fifth to one-tenth the quantity of the crude oil; coal-dust, one tenth of the quantity of the crude oil; and caustic soda, one-tenth the quantity of the crude oil, all as measured by weight. The composition is then thoroughly mixed and heated in a vessel over an active fire for one or two hours to form a pasty mass, like stiff dough, in which state the fuel is ready for use. One difficulty to be encountered with this composition is the substantial amount of time involved in its heating and drying. Another difficulty is that it forms a pasty mass rather than a secure, stable solid form.

All of the foregoing compositions are believed to be relatively fast burning substances with relatively low BTU output, both disadvantageous features for synthetic fire logs which ideally should be of relatively long burning duration with relatively high BTU output. By means of my invention, as hereinafter described, these and other difficulties encountered using prior art synthetic fire logs are substantially reduced or otherwise overcome.

SUMMARY OF THE INVENTION

It is an object of my invention to provide an improved synthetic fire log having relatively long burning time and high BTU output.

It is a further object of my invention to provide a method for making an improved synthetic fire log having relatively long burning time and high BTU output.

It is also an object of my invention to provide a synthetic fire log and method for making the same utilizing liquefied or coal liquid.

Briefly, in accordance with my invention, a quantity of relatively dry wood fibers or sawdust is provided and mixed with appropriate quantities of coal liquid, molasses and wax at a temperature at least sufficient to form a thoroughly incorporated mixture. The mixture thus formed is compressed in a mold to form a compact, solid mass after which the mass is removed from the mold.

These and other objects, features and advantages of my invention will become apparent to those skilled in the art from the following detailed description and attached drawings upon which, by way of example, only a preferred embodiment of my invention is illustrated.

Description of the Preferred Embodiment

Figure 1:
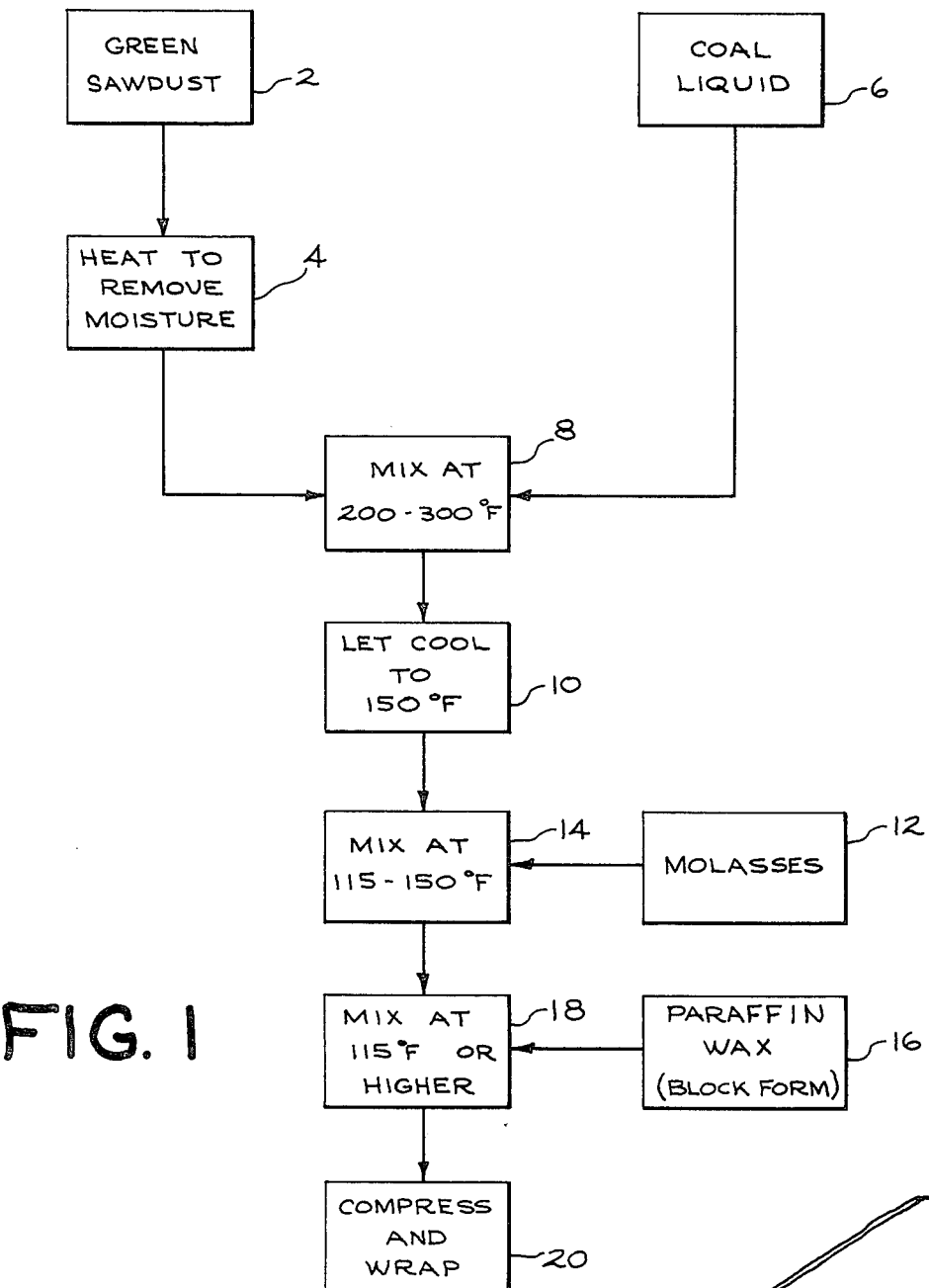
FIG. 1 shows a block diagram of the various steps in a method for making synthetic fire logs thus illustrating one preferred embodiment of my invention.

Referring now to FIG. 1 of the drawing, there is shown in one preferred embodiment of my invention, a method for making improved synthetic fire logs.

Figure 2:
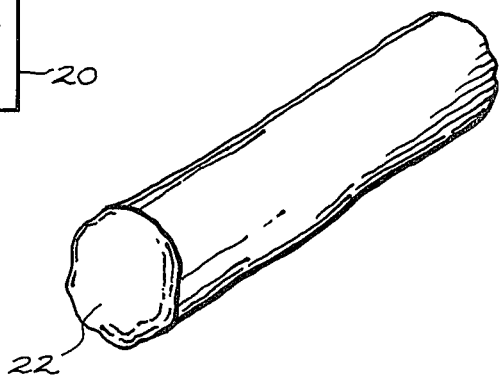
FIG. 2 shows an oblique projection of a synthetic fire log made according to the process of FIG. 1.

First, a quantity of green sawdust 2, is provided and heated, as at block 4, to a temperature preferably in the range of about 250-300 degrees F. for about 10-20 minutes to reduce the moisture content thereof. Next, a quantity of coal liquid 6, such as is manufactured by CoaLiquid, Incorporated of Shelbyville, Kentucky, is mixed with the dried sawdust, as at block 8, while the latter is still in an elevated temperature range of from about 200 to 300 degrees F. The subject coal liquid 6 is a liquid suspension produced from a slurry of pulverized coal and water which has been sonically vibrated and in which excess water or oil has been separated as disclosed in U.S. Pat. No. 3,941,552 issued to E. C. Cottell on March 2, 1976. Thereafter, the mixture of heated sawdust and coal liquid is allowed to cool to a temperature range of about 115-150 degrees F., as at block 10, and while in this range, a quantity of sorghum or other form of molasses 12 is added and mixed for thorough incorporation as at block 14. Next, while the latter mixture is within an elevated temperature range of from about 115-150 degrees F., a quantity of paraffin wax 16 in block form is added and thoroughly mixed as it melts, as at block 18. Thereafter, the resulting mixture is compressed in a suitable mold, preferably of cylindrical shape, as at block 20, to form an improved synthetic fire log. Lastly, the compressed mass is removed from its mold after it has cooled to a suitable handling temperature, whereby a synthetic fire log 22 as shown in FIG. 2 is provided which may then be rolled in a suitable flame coloring agent and/or wrapped in a paper container suitable for shipping, storage and use as an igniter.

While I have found that the proportions of sawdust, coal liquid, molasses and wax used to form the synthetic fire log of my invention may vary over a fairly wide range and are, therefore, not critical. I believe that best results will be obtained where the starting materials are mixed in the following approximate proportions: green sawdust (prior to heating to reduce moisture content), 55 percent by weight; paraffin wax in block form, 18 percent by weight; coal liquid, 23 percent by weight; and sorghum molasses, 4 percent by weight. A fire log formed in this manner according to the foregoing preferred proportions will compress readily into a solid, stable mass, will be easily ignitable using a match, even without paper wrapping, and will have increased burn time and BTU heat output as compared with many conventional synthetic fire logs.

I have also found, while a 23 percent by weight proportion of coal liquid in the mixture is about optimum, that the proportion of this substance in the mixture can be varied from about 6 percent by weight up to about 32 percent by weight. Below this range, while the resulting log may burn, there will not be a sufficient quantity of coal liquid present to add appreciably to the burning time or heat output of the resulting log as compared to conventional synthetic fire logs in present use. Above this range, the resulting log will tend to sweat, leak or drip coal liquid which not only makes it messy to handle, but adversely affects the compressibility and stability of the log mass. In addition, drippage of coal liquid from such a log presents a hazard since hot, flaming coal liquid may drip from the log during use and run beyond the bounds of a fireplace. Accordingly, while exacting experimentation may show that the coal liquid range may be somewhat greater or smaller than that disclosed, I consider the usable proportion of coal liquid in the fire log of my invention to be any proportion which will appreciably contribute to burning time and heat output of the log without resulting in hazardous and messy sweating or dripping of coal liquid from the compressed log during its use.

Through experimentation with fire logs formed according to my invention, it appears that, when lighted with a match, the wax trapped in the compressed log ignites first. Thereafter, the hot and rapid burning wax ignites the molasses which, in turn, ignites the coal liquid impregnated sawdust. It, therefore, appears that the wax added to the mixture should not be much less than about 18 percent by weight of the total weight of all the batch materials although its weight proportion may be increased substantially above this value, say as high as about 30 percent by weight. Much lesser quantities of wax than the 18 percent by weight quantity specified will result in a log having poor bonding quality, whereby the log will tend to crumble and break apart with handling. Much greater quantities of wax than the preferred proportion will cause the resulting log to burn too hot and be consumed more rapidly than desirable.

The proportion of molasses added to the mixture should not be less than about 2 percent by weight since there would not then be a sufficient quantity of molasses in the resulting log to insure that the coal liquid and sawdust combination will become ignited. A much greater proportion of molasses than the preferred 4 percent by weight proportion will added to the liquescent combination of coal liquid and molasses and may result in dangerous drippage during use of the log. An increased quantity of molasses may also be found to cause the log to burn with an intense and sickeningly sweet aroma and, therefore, be undesirable from that standpoint. I have, however, had satisfactory results burning a fire log made according to my invention to which batch mixture was added up to 10 percent by weight of molasses.

The range of proportions of sawdust usable in the log of my invention is, in large measure, dependent upon (1) the proportion of coal liquid to be mixed therewith to form a well saturated by drippage free coal liquid/sawdust combination, (2) the proportion of paraffin wax necessary to form a stable log mass when compressed and to be readily ignitable with a match, and (3) the proportion of molasses necessary to be ignited by the burning wax to, in turn, ignite the coal liquid/sawdust combination. In general, the more sawdust used in proportion to coal liquid, the more the resulting fire log will simply burn like a natural wood log. The less sawdust used in proportion to coal liquid, the hotter and longer the resulting log will tend to burn but also the more likely the log will be to drip or leak its liquescent combination of molasses and coal liquid. The proportions of these various materials must, therefore, be selected with each of these factors in mind in order to obtain a practical, safe, efficient burning and stable synthetic fire log according to my method.

Although the present invention has been described with respect to specific details of a certain preferred embodiment thereof, it is not intended that such details limit the scope and coverage of my invention otherwise than as set forth in the following claims.

I claim:

1. A method for making synthetic fire logs, the steps of which comprise
   providing a quantity of relatively dry sawdust,
   mixing said quantity of relatively dry sawdust with of coal liquid, molasses and wax at an elevated temperature at least sufficient to melt said wax and form a thoroughly incorporated mixture,
   compressing said mixture in a mold to form a compacted mass, and
   removing said compacted mass from said mold after said mass has cooled to a suitable handling temperature wherein the proportion of coal liquid mixed in said mixture is in a range of about 6-32 percent by weight of the total weight of said green sawdust, coal liquid, molasses and wax used to form said mixture.

2. The method of claim 1, the steps of which further comprise heating a quantity of green sawdust to a temperature range of about 250-300 degrees F. for 10-20 minutes to reduce the moisture content thereof and thereby provide said quantity of dry sawdust.

3. The method of claim 1 wherein the proportion of coal liquid mixed in said mixture is at least sufficient to increase the burning time and BTU output of said compacted mass and wherein the proportion of coal liquid and molasses in said mixture is less than that amount which will cause said compacted mass to leak or drip coal liquid when burning.

4. The method of claim 2 wherein the proportion of said coal liquid added to said mixture is about 18 percent by weight of the total weight of said green sawdust, coal liquid, molasses and wax used to form said mixture.

5. The method of claim 2 wherein the proportion of said wax added to said mixture is in a range of about 18–30 percent of the total weight of all of the materials used to form said mixture.

6. The method of claim 2 wherein the proportion of molasses added to said mixture is within a range of about 2–10 percent by weight of the total weight of all of the materials used to form said mixture.

7. A synthetic fire log made according to the method of claim 1.

8. A method for making a synthetic fire log, the steps of which comprise
   providing a quantity of green sawdust,
   heating said green sawdust for a period of time to reduce the moisture content thereof and dry the same,
   mixing said heated sawdust with a quantity of coal liquid,
   mixing a quantity of molasses with said heated sawdust and coal liquid to thoroughly incorporate said quantities,
   mixing a quantity of wax with said incorporated quantities at a temperature level at least sufficient to melt said wax,
   compressing said quantities of wax, sawdust, coal liquid and molasses in a mold to form a compacted, solid mass, and
   removing said mass from said mold after said mass has cooled to a handling temperature wherein the proportion of coal liquid mixed in said mixture is in a range of about 6–32 percent by weight of the total weight of said green sawdust, coal liquid, molasses and wax used to form said mixture.

9. A synthetic fire log made according to the method of claim 8.

10. The method of claim 1 wherein the proportion of said coal liquid added to said mixture is about 23 percent by weight of the total weight of said green sawdust, coal liquid, molasses and wax used to form said mixture.

* * * * *